E. B. MARTINDALE.

PULLEY.

No. 10,494. Reissued June 24, 1884.

WITNESSES.

Chas. N. Leonard.

E. W. Bradford.

INVENTOR.

Elijah B. Martindale,

PER

C. Bradford,

ATTORNEY.

UNITED STATES PATENT OFFICE.

ELIJAH B. MARTINDALE, OF INDIANAPOLIS, INDIANA.

PULLEY.

SPECIFICATION forming part of Reissued Letters Patent No. 10,494, dated June 24, 1884.

Original No. 266,709, dated October 31, 1882. Application for reissue filed April 24, 1884.

*To all whom it may concern:*

Be it known that I, ELIJAH B. MARTINDALE, of the city of Indianapolis, county of Marion, and State of Indiana, have invented certain new and useful Improvements in Wheels or Pulleys, of which the following is a specification.

The object of my said invention is to produce a strong and durable wheel or pulley from sheets of paper or pasteboard, which shall be adapted to be used as a belt or friction pulley for machinery, and for various other purposes.

It consists of a web or central portion consisting of disks of paper or pasteboard laid together extending from the hub to the periphery of the wheel, and when additional width of face is desired a rim consisting of rings laid around the outer edge of said web, the whole being pressed into a compact mass, and secured firmly together by means of an adhesive substance being spread over the several sheets or layers before they are placed together. For the purpose of giving addition strength I prefer to add a ring of iron upon each outer surface and pass bolts or rivets through the completed structure.

I am aware of the construction shown in combined iron and paper car-wheels, in which layers of paper form the internal portion of the body of the wheel, and I therefore disclaim such a construction.

Figure 1:
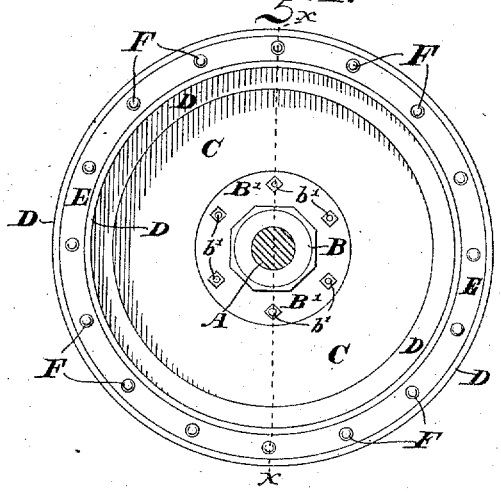
Figure 2:
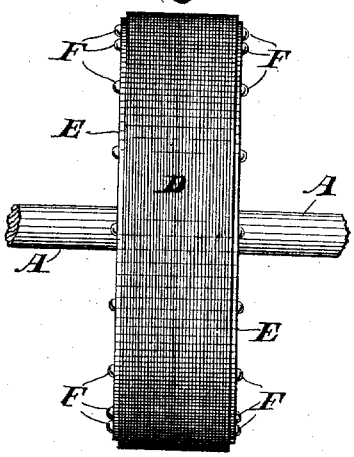
Figure 3:
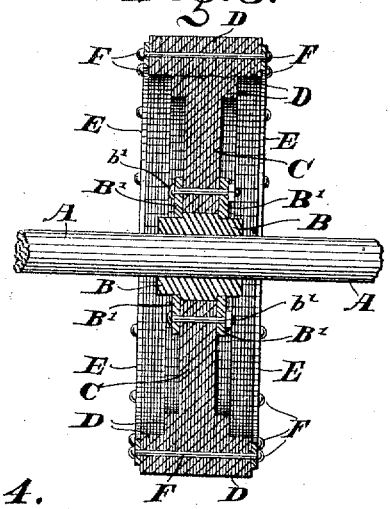

Referring to the accompanying drawings, which are made a part hereof, and on which similar letters of reference indicate similar parts, Figure 1 is a side elevation of my improved wheel; Fig. 2, a front elevation thereof; Fig. 3, a central vertical section on the dotted line *x x* in Fig. 1, and Fig. 4 a perspective view of the hub.

In said drawings, the portions marked A represent the shaft on which the wheel is mounted; B, the hub to said wheel; C, the web or central portion of said wheel; D, the rim thereto; E, the iron rings by which the rim is strengthened, and F bolts or rivets for securing said rings to said rim, and also strengthening said rim and the pulley generally.

Figure 4:
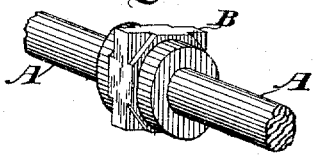

The hub B is preferably formed as shown in Fig. 4. The central portion, on which the web C is mounted, is square, octagon, or some similar form, to prevent said web from turning thereon. The center may be continued in the same form far enough to receive the removable flanges B′, or the form may be changed, as shown in the drawings; but in any event the form should be such as will effectually prevent said flanges from turning on said hub. The ends of the hub are preferably formed round, for the sake of appearance. When the hub is constructed as shown in the drawings, a shoulder is formed, against which the flanges B′ rest. Said flanges are secured to the wheel by the bolts *b′*, as shown.

The web C is formed of numerous sheets of paper or pasteboard coated with some adhesive substance and laid together, and said sheets also extend through to the periphery of the wheel, thus forming a part of its operating surface or face. The bringing into service the edges of the sheets of paper as the operating-surface is important, and secures much better results than is possible where the side of the paper forms the face of the pulley. Where the edges form the face, said face is capable of being made very smooth, thus preventing to a great extent the slipping of the belts, as (as is well known) belts slip much less easily on a smooth surface than any other. Besides this, the strength and wearing qualities of the surface are much greater when constructed in this manner than when the outside of the pulley is formed by winding, as will be readily understood.

The rim D is composed of rings of sufficient width to give the required strength, which are secured to the sides of the central portion, C, enough being used to give the pulley the required width of face. It will be understood, of course, that for narrow-faced wheels but few or none of these rings will be required, the web C forming its own rim in such cases.

The iron rings E are preferably nearly as large as the outer of the rings which compose the rim, and are secured to said rim by the bolts or rivets F. They are made of somewhat less diameter than the wheel, as shown, so that the belt (or, if a friction-pulley, the other wheel) shall not come upon the iron, but only on a paper surface.

The bolts or rivets F are used to secure the rings E to the rim of the wheel, and to aid in holding the several layers of which the rim is composed together, thereby strengthening the entire wheel.

Having thus fully described my said invention, what I claim as new, and desire to secure by Letters Patent, is—

1. A wheel or pulley the operating surface or face of which is composed of the edges of the sheets or rings of paper pasted, pressed, and secured together, which form its body or rim, substantially as described.

2. A wheel or pulley composed of sheets of paper or pasteboard pasted, pressed, and secured together, extending to the surface, said surface being thus composed of the edges of said sheets, substantially as described.

3. A wheel or pulley the rim whereof is composed of sheets of paper or pasteboard pasted, pressed, and secured into one solid mass, said sheets being cut into rings and built up so that the edges thereof form the surface or face of the rim, substantially as described.

4. A wheel or pulley having a disk or web composed of sheets of paper or pasteboard pasted, pressed, and secured together into one solid mass and extending from the hub to the periphery of the wheel, the edges of the sheets thus forming the face or a part of the face or periphery of the wheel, substantially as described.

5. The combination, in a wheel or pulley, of a hub, a web or body, and a rim composed of sheets of paper or pasteboard pasted, pressed, and secured together diametrically of the wheel, the edges whereof form the operative surface or face thereof, substantially as described.

6. The combination of the hub B, web C, rim D, said rim and said web being composed of layers of paper or pasteboard arranged as specified, metal rings E, and bolts or rivets F, all substantially as set forth.

7. The combination, in a pulley, of the hub B, the central portion of which is shouldered, and of a form to hold the pulley from turning thereon, and flanges B′ B′, which come against the shoulders on said hub, and are secured to said wheel by bolts *b*′, thus also holding said pulley fixedly on said hub, substantially as shown and specified.

In witness whereof I have hereunto set my hand and seal, at Indianapolis, Indiana, this 19th day of April, A. D. 1884.

ELIJAH B. MARTINDALE. [L. S.]

In presence of—

C. BRADFORD,

CHAS. L. THURBER.